April 22, 1969 T. HORVATH 3,439,548
TORQUE GENERATOR

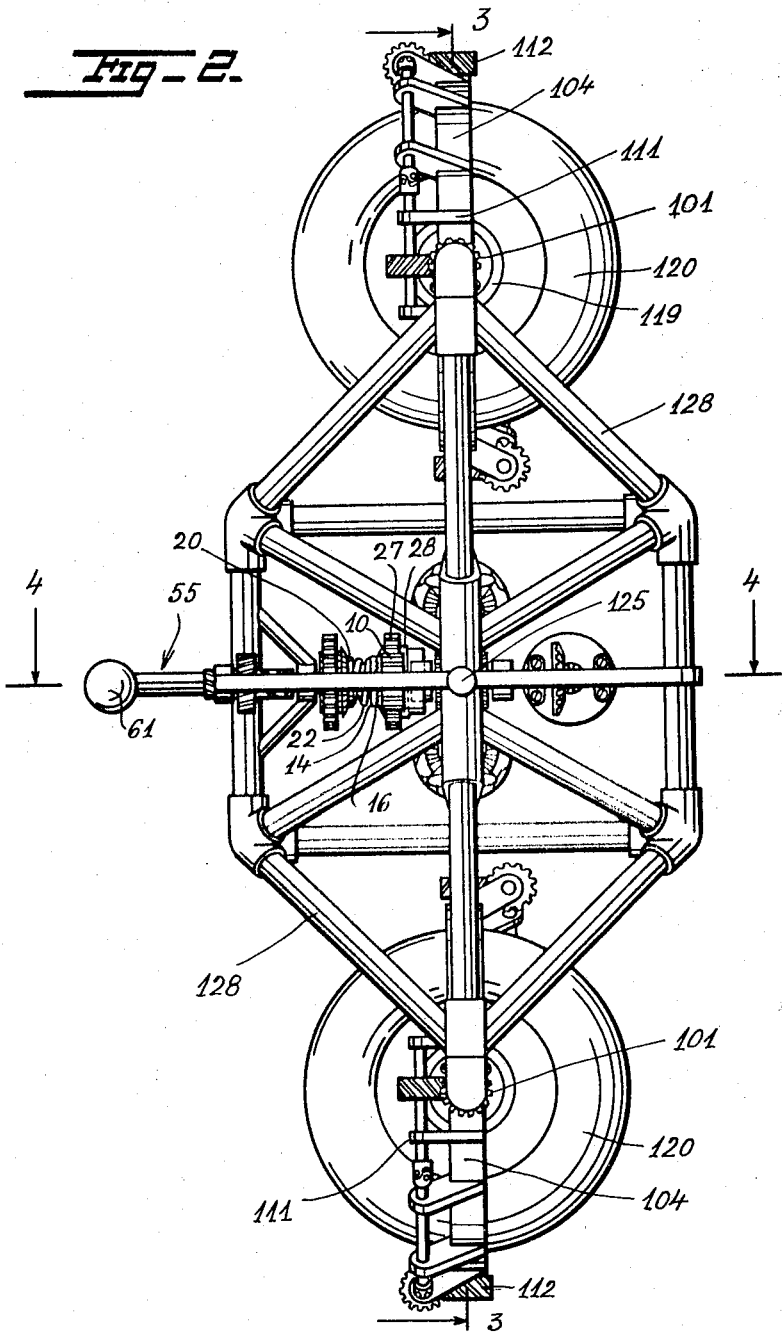

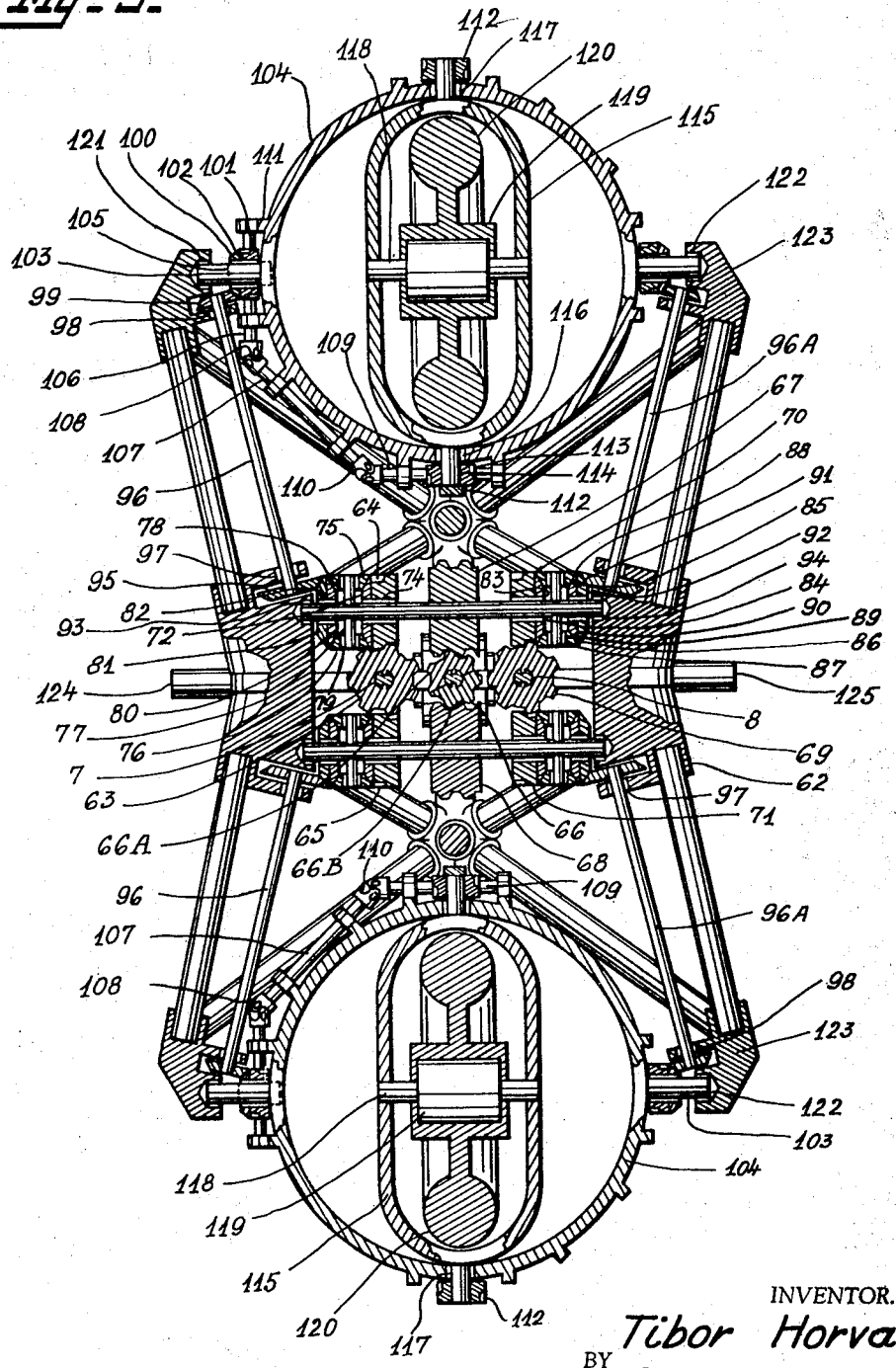

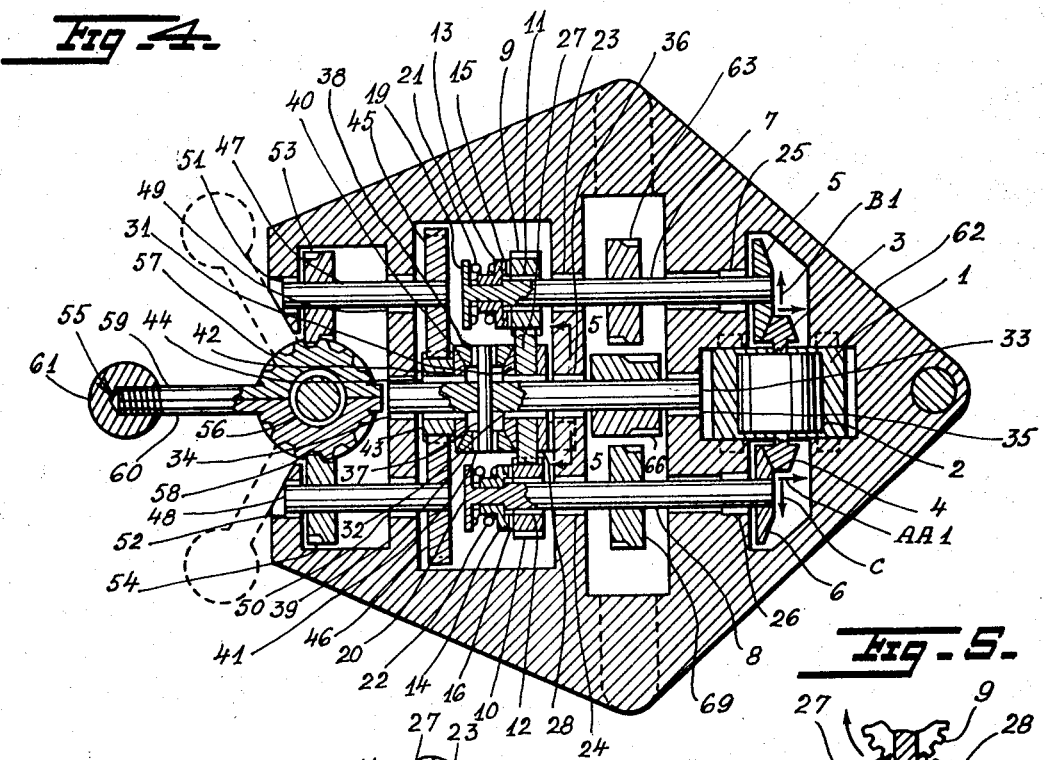

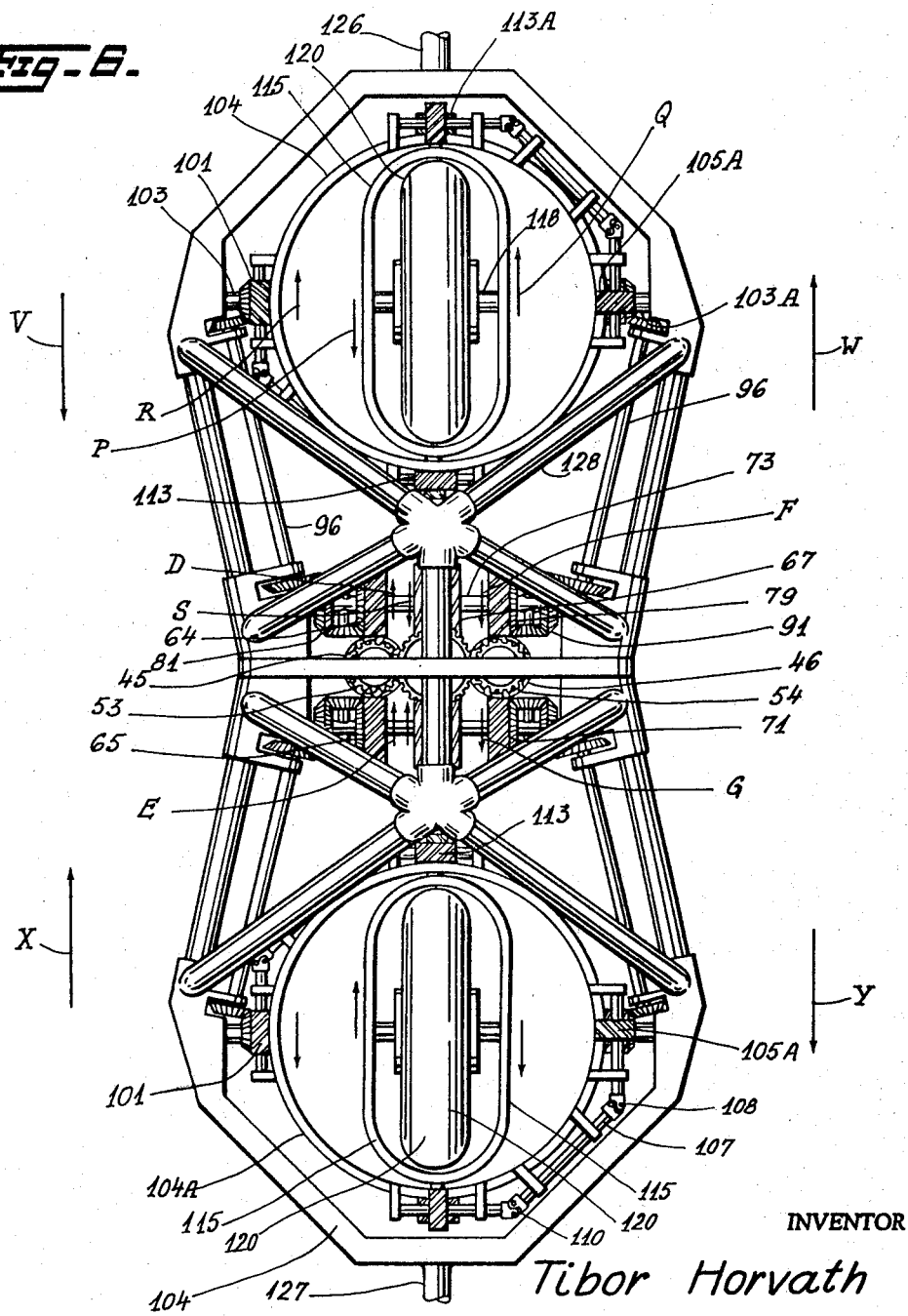

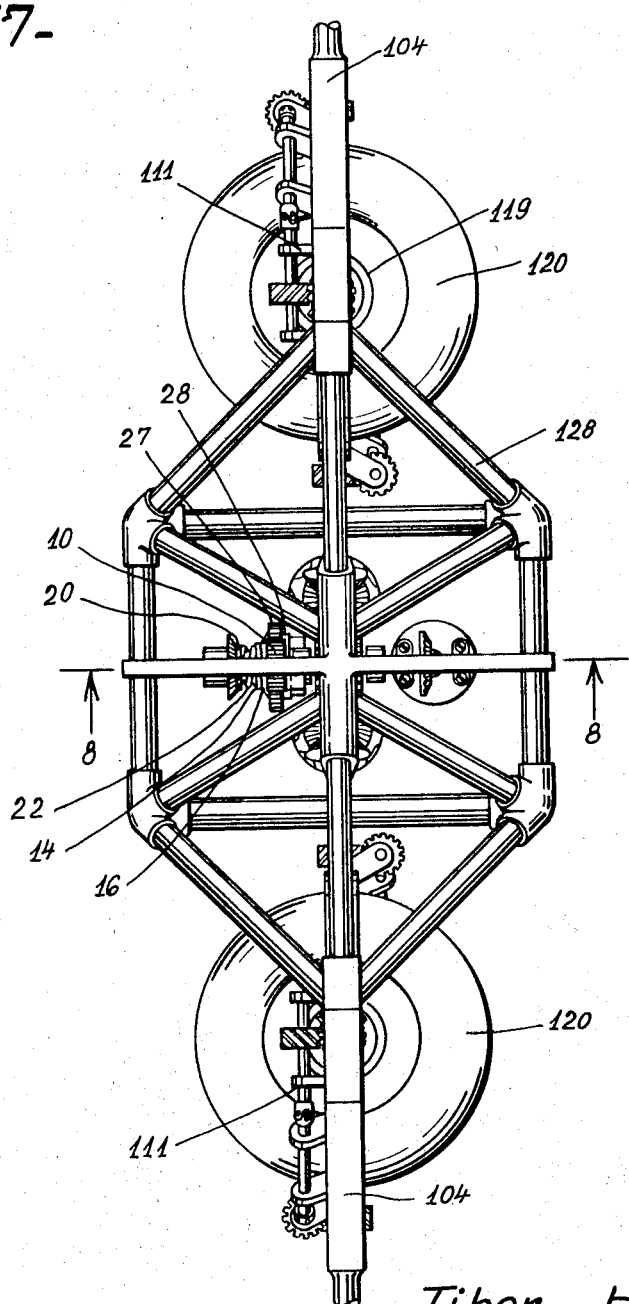

Filed Jan. 28, 1966 Sheet 7 of 8

INVENTOR
Tibor Horvath
BY Polachek & Saulsbury
ATTORNEYS

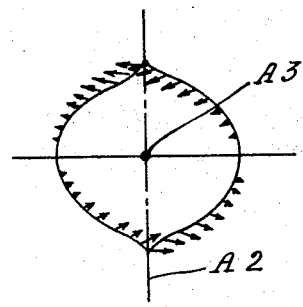
Fig-9H.
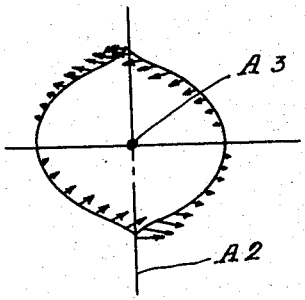
Fig-9J.
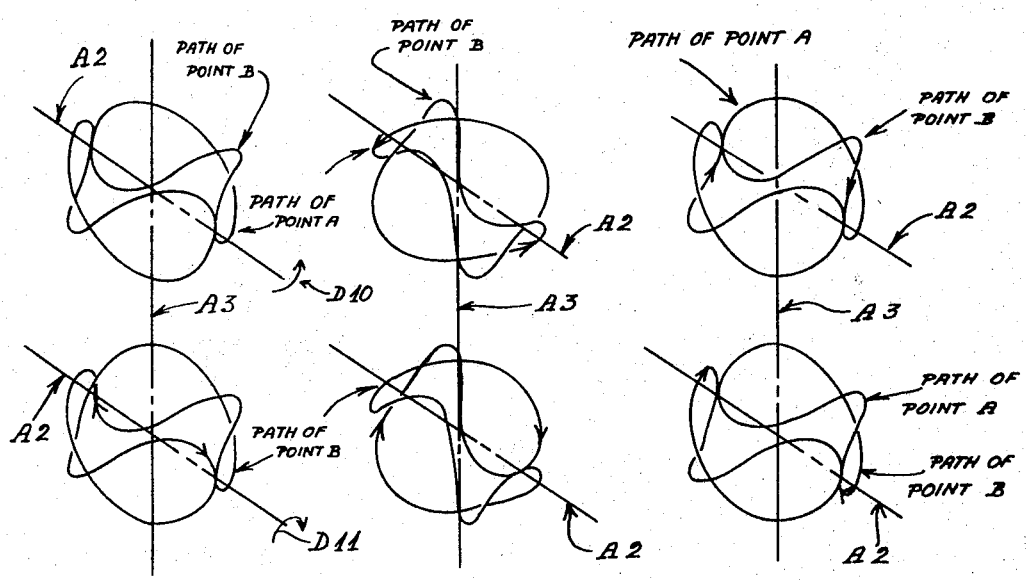
Fig-9K. Fig-9K.' Fig-9M.

3,439,548
TORQUE GENERATOR
Tibor Horvath, Brooklyn, N.Y., assignor of one-eighth each to Heino Janson, Flushing, and Gene A. Papi, New York, N.Y.
Filed Jan. 28, 1966, Ser. No. 523,702
Int. Cl. G01c 19/04
U.S. Cl. 74—5.34                          3 Claims

ABSTRACT OF THE DISCLOSURE

In a frame on a longitudinal axis there are disposed two counter rotating flywheels rotating about parallel axes disposed normal to the longitudinal axis. The axes of rotation of the flywheels are rotated in the plane of the longitudinal axis with gear linked control of their resulting precession to cause rotation of the frame for use as a motor or for purposes of positional orientation. When used for positional orientation, control means may be provided to shift the limits of the flywheel precession.

This invention relates to gyratory apparatus and more particularly concerns gyroscopic apparatus which generates rotational forces.

A first object of the invention is to provide gyroscopic apparatus which generates a rotating force without creating counter rotating reaction.

A second object is to provide a gyroscopic device or instrument which can be constructed in a relatively small size for use in equipment such as a space capsule, which device will be able to surpass in efficiency currently used rotational force creating mechanisms such as jet operated devices employed to control attitudes of space capsules when in flight.

A third object is to provide a machine which can be used counterbalancing the torque generated in a helicopter by its engine, thus eliminating the tail rotor or counter rotor conventionally used.

A fourth object is to provide a mechanism which can be used as an engine having very high efficiency.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIG. 2 is a side elevational view of the device of FIG. 1.

FIG. 3 is a vertical sectional view taken on line 3—3 of FIG. 2.

FIG. 4 is a horizontal sectional view taken on line 4—4 of FIG. 2.

FIG. 5 is a fragmentary sectional view taken on line 5—5 of both FIG. 4 and FIG. 8.

FIG. 6 is a front elevational view of another device embodying the invention.

FIG. 7 is a side elevational view of the device of FIG. 6.

FIG. 8 is a horizontal sectional view taken on line 8—8 of FIG. 7, and

Figure 1:
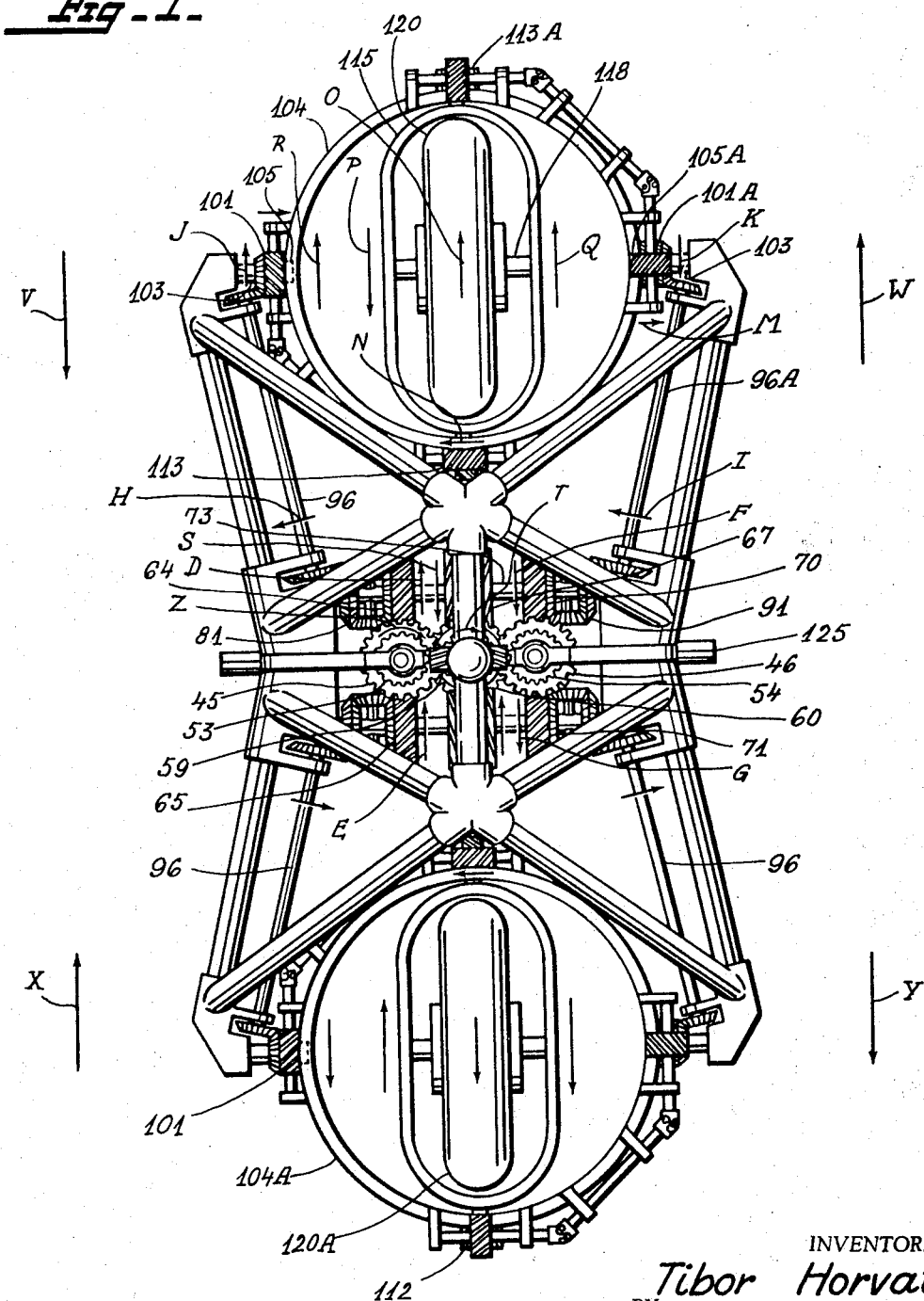
FIGURE 1 is a front elevational view of a device embodying the invention.

FIGS. 9a thru 9m are diagrams used in explaining the invention.

Referring first to FIG. 4, there is shown an electric motor 1 which has two pinions 3 and 4 located at opposite ends of the motor armature 2. Pinions 3 and 4 mesh with beveled gears 5 and 6 respectively. The beveled gears are secured on shafts 7 and 8 which are respectively supported by bearings 23, 25 and 24, 26. The shafts also support gears 9 and 10 through bearings 11 and 12. Gears 9 and 10 are operatively connected to plates 13, 14 through teeth 15, 16 in such a way as to form a ratchet system; see FIG. 2. The arrangement of teeth 15 is opposite to that of teeth 16. Plates 13 and 14 are held by shafts 7 and 8 through slots so as to impart axial motion to plates 13 and 14 between gears 9, 10 and flanges 19, 20. Flanges 19, 20 are formed at one end of shafts 7 and 8. Springs 21 and 22 are disposed between plates 13, 14 and flanges 19, 20 to press the plates against gears 9 and 10 respectively. Gears 9 and 10 mesh with gear 27 which has twice the diameter of gear 9 or gear 10. One side of gear 27 is supplied with a plate 28 which has two stop elements 29, 30. These stop elements are located diametrically opposite of each other as shown in FIG. 5. The purpose of the stop elements is to permit only a ninety degree range of free rotation of gear 27.

On the other side of gear 27 is a beveled gear 31. Gears 27, 31 and plate 28 are located in a bearing 32 which is held by shaft 33. Shaft 33 is supported by bearings 34, 35 and 36. Shaft 33 holds another shaft 37 which is axially perpendicular to shaft 33. Shaft 37 supports a pair of pinions 38, 39 through bearings 40, 41. The pinions 38, 39 mesh with beveled gears 31 and 42. Beveled gear 42 is mounted together with gear 43 on bearing 44 which is also located on shaft 33. Gear 43 meshes with gears 45 and 46, each of which is twice the size of gear 43. Gears 45 and 46 are secured to shafts 47 and 48. These shafts are supported by bearings 49, 51 and 50, 52. Shafts 47 and 48 also support helical gears 53 and 54 which mesh with control assembly 55 which has one and one half times the diameter of gears 53 and 54.

The control assembly is supported by bearing 56 and is composed of two half worm gears 57 and 58. The teeth of gears 57, 58 are constructed so that they are symmetrical to each other. Each half worm gear is supplied with half shafts 59 and 60 which when mounted together form a shaft on which knob 61 is attached. The teeth of each half worm gear is formed in such an angle as to allow helical gears 53 and 54 a forty-five degree range of rotation while moving control assembly 55 from one extreme position to the other shown by dotted lines in FIG. 4. Housing 62 supports all components thus far described.

Referring now to FIGS. 3 and 4, there are shown shafts 7, 8 and 33. Shaft 7 supports a forty-five degree helical gear 63 which meshes with two other forty-five degree helical gears 64 and 65. Gears 64 and 65 each have the same diameter as gear 63. Shaft 33 carries worm wheel assembly 66 which consists of two halves 66A and 66B which are formed symmetrically to each other and are meshing with worm gears 67 and 68 respectively. Worm gears 67 and 68 each have twice the diameter of worm wheel assembly 66, and the angle of the teeth are formed to allow worm wheel assembly 66 to turn once while worm gears 67 and 68 turn twice. On shaft 8, there is another helical gear 69 which meshes with helical gears 70 and 71. The description and relation to each other of the gears 69, 71 and 72 are the same as that of gears 63, 64 and 65.

It will be apparent that from FIGS. 1, 2, 3 of the drawings, the apparatus has two like halves, upper half and lower half, which are similar to each other in both operation and construction. For this reason only the upper half will be discussed in detail. The same discussion will apply to the lower half.

Helical gear 64 is mounted together with beveled gear 72. Both gears are supported by shaft 73 through bearing 74. Two pinion gears 75, 76 are supported at the two ends of shaft 77 through bearings 78, 79 respectively.

Shaft 77 is mounted ninety degrees to shaft 73. Both pinion 75 and 76 mesh with beveled gears 72 and 80. Beveled gear 80 is mounted with beveled gear 81, and both are supported by shaft 73 through bearing 82. Looking at the opposite end of shaft 73, the construction and relation to each other of helical gear 70 to beveled gears 83, 90 and 91, bearings 84, 92 of the gears, pinion gears 85, 86, bearings 88, 89 of the pinions, and shaft 87, are the same as above described parts 64, 72 and 74–82. Shaft 73 is supported by housing 62 through bearings 93 and 94.

Beveled gear 81 meshes with beveled gear 95 which is secured on one end of shaft 96. Both gears 81, 95 have the same diameter. Shaft 96 is supported by bearings 97 and 98. The other end of shaft 96 supports beveled gear 99 which meshes with beveled gear 100. Both gears 99, 100 have the same diameter. Gear 100 is mounted together with a forty-five degree helical gear 101. Both gears 100, 101 are held by bearing 102. This bearing is located on shaft 103 which is part of ring 104. Helical gear 101 meshes with similarly constructed gear 105. Both gears 104, 105 have the same diameter. Helical gear 105 is secured to shaft 106 which is connected to shaft 107 by a universal joint 108. All three shafts 106, 107, 109 are supported by three pairs of forks 111 which are part of ring 104. Shaft 109 supports another forty-five degree helical gear 112 which meshes with similarly constructed gear 113. Gears 112, 113 have the same diameter. Gear 113 is secured to shaft 114 which is part of an O shaped supporting ring 115. This ring is held by ring 104 through bearings 116, 117. Shaft 118 is a stationary part of an electric motor secured to supporting ring 115. Rotary housing 119 of the electric motor is part of a flywheel 120.

Looking at FIG. 1, it will be apparent that the construction of the upper right side of the apparatus starting from beveled gear 91 is identical to the upper left side which has just been described. Therefore no further detailed description is required of the right side. Ring 104 is supported by bearings 121, 122. These bearings are held by frame assembly 123. Shafts 124, 125 support the entire apparatus when in use in a device such as a space capsule, in order to change the plane through which a capsule may be rotated in space. Shafts 126 and 127 shown in FIG. 6 are provided to enable the entire apparatus to revolve at these shafts when the apparatus is used as an engine.

Figure 9A:
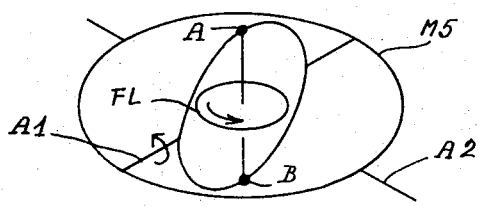

For a better understanding of the operation of the apparatus, it will first be necessary to discuss a few of the basic applicable characteristics of a gyroscope. Reference will be made to FIGS. 9a–9m. When the axis of a rotating flywheel FL is changed, a reaction resulting in a rotating force ninety degrees to that of the changing motion takes place; see FIGS. 9a and 9b. The reacting force is indicated by the path of points A and B. In the case of a one hundred eighty degree rotation, an exchange of positions takes place between points A and B. This creates a rotating around axis A3 indicated in FIG. 9b. The reacting force has a tendency to rotate around a horizontal axis, in this case it is axis A2 indicated in FIG. 9a. Taking advantage of this phenomenon, at the moment point A and point B exchange places, the thus far firmly held stationary body M5 of FIG. 9a is given freedom of rotation around its axis A2, while continuing rotation of as a flywheel at axis A1. This results in a rapid rotation of the whole body M5 around its axis A2, but the body is allowed to turn only one hundred eighty degrees so that points A and B come back to their original positions; see FIG. 9c.

Figure 9B:
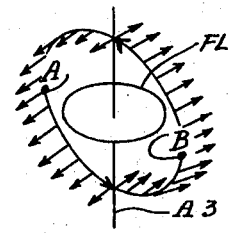
Figure 9C:
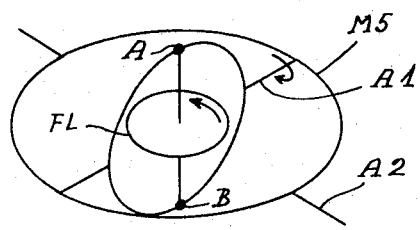
Figure 9D:
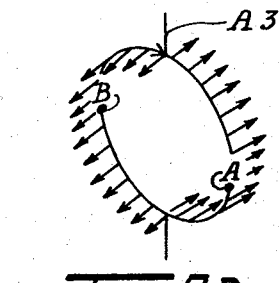
Figure 9E:
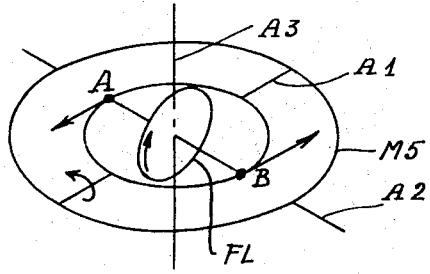

Continuing with rotation of axis A1 as points A and B exchange places again, a rotating force develops which is identical to that illustrated by FIG. 9b; see FIGS. 9c and 9d. At this point, freedom of rotation of body M5 through a range of one hundred eighty degrees will result in rapid exchange of places between points A and B, whereby everything gets back to the same position it was shown in, in FIG. 9a. The second one hundred eighty degree rotation is in a direction opposite from the first one hundred eighty degree rotation and takes place around axis A2.

Figure 9F:
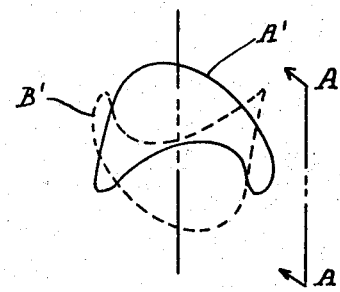

Continuous action carried out in the described manner will result in a back and forth rocking of the apparatus at axis A2 and a pulsing rotating reaction around axis A3. This theoretical mode of operation may not be entirely suitable for practical use because the sequence of operation may not be smooth enough. Every time the shaft of the flywheel reverses itself around axis A2, it creates a shock which will require proper shock absorbers to absorb. Furthermore the entire apparatus will be subject to a great deal of wear. Therefore, in the present invention, the one hundred eighty degree rapid rotation is synchronized with the rotation of axis A1. As soon as points A and B are out of line with respect to axis A2 they influence a rotation of axis A2; see FIG. 9e. The path which points A and B then follow are indicated in FIG. 9f. The solid line A' is the path of point A, while the dotted line B1 is the path of point B.

Figure 9G:
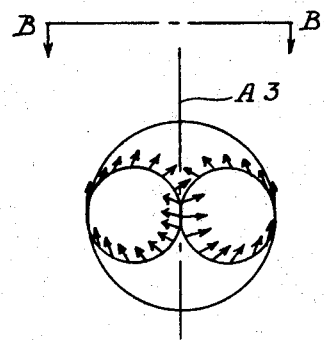

In order to have a clearer view of the forces that occur along these paths, FIG. 9g illustrates a view of the path of point A in FIG. 9f taken on line A—A of FIG. 9f.

Figure 9I:
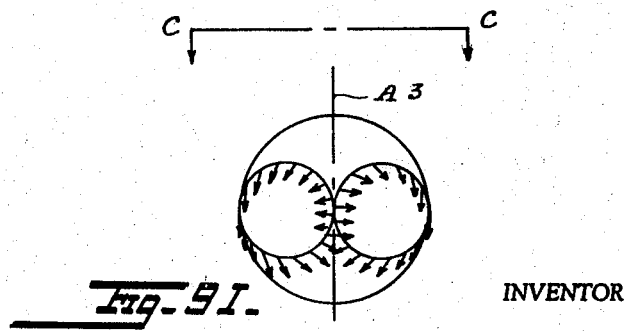

FIG. 9h is a top view of the path shown in FIG. 9g taken on the line B—B. FIG. 9i is an illustration of the path of point B taken on line A—A of FIG. 9f. FIG. 9j is a top view of the path of FIG. 9i taken on line C—C. It is clear that both forces that appear on the paths of points A and B, create a rotating action around axis A3 in the same direction.

Another gyroscopic apparatus is assumed to be located right below the one described above; see FIGS. 9k, 9k', 9m. Since the two mechanisms are operating in a symmetrically opposite manner to each other, the only coinciding rotating forces which are created by the two mechanisms, are around axis A3. All other forces are equal and opposite creating a balance in each other axis.

Thus the result in general is the creation of a pair of rotating forces along the same axis A3 in FIG. 9k.

In order to create a complete balance between the upper and lower parts of the apparatus of FIG. 9k' the one hundred eighty degree axial freedom of both mechanisms is shifted ninety degrees in direction of arrows D10 and D11 as indicated in FIG. 9k. To achieve a rotation on axis A3 in the opposite direction, the one hundred eight degree axial freedom of both mechanism is shifted another ninety degrees in the direction of arrows D10 and D11 in FIG. 9k; see FIG. 9m.

What has been just described is the theory on which the control of the mechanism in FIGS. 1–5 is based. In operation, of this form of the invention, suppose that armature 2 of motor 1 is rotating in the direction arrow AA1 indicates; see FIG. 4. The armature turns gears 5 and 6 in the direction indicated by arrows B1 and C, respectively. Gears 5 and 6 turn shafts 7 and 8 and all other parts associated with them except gears 9 and 10.

Referring to FIGS. 1 and 3, gear 63 on shaft 7 turns gears 64 and 65 in the direction arrows D and E indicate. Gear 69 on shaft 8 rotates gears 70 and 71 in direction of arrows F and G. From this point on, only the upper half will be discussed in detail since the bottom half is symmetrical in operation to that of the upper half.

Gear 81 will rotate in the direction opposite to direction D of gear 64. Pinions 75 and 76 will not orbit around shaft 73 under the load of power transfer between gears 64 and 81 because the same amount of load takes place from the power transfer between gears 70 and 91 in the opposite direction. As a result, shaft 96 will rotate in the direction of arrow H, while shaft 96A rotates in the direction of arrow I. Consequently, gears 101 and 101A rotate in the direction of arrows J and K. Since gears 101 and 101A rotate in opposite directions, they give ring 104 free control of rotation in either direction at its shafts 103 and 103A.

Gear 101 rotates gear 105 in the direction of arrow L while gear 105A turns in direction of arrow M. Gears 113 and 113A and consequently supporting ring 115 turn in the direction of arrow N. Flywheel 120 is rotating at high speed in direction of arrow O. When supporting ring 115 rotates in the direction of arrow N, a pair of forces is created at the two ends of stationary shaft 118 indicated by arrows P and Q. This pair of forces will tend to rotate ring 104 in the direction of arrow R. This action results in speeding up the rotation of gear 101 and in slowing down the rotation of gear 101A by the same amount.

The same thing happens to gear 81 and gear 91 respectively. Thus pinions 75 and 76, and 85 and 86 are forced to revolve around shaft 73 turning worm gear 67 in direction of arrow S. Gear 67 turns worm wheel 66 in direction of arrow T. Worm wheel 66, which connects worm gears 67 and 68, provides an almost independent rotating action between the upper ring 104 and the bottom ring 104A. This is to say they cannot influence each other to rotate faster than their own gyroscopic action dictates.

Referring to FIG. 4, since helical gears 53 and 54 cannot rotate control assembly 55, it is obvious that beveled gear 42 must be stationary. Therefore, pinions 38 and 39 which are revolving around shaft 33 will rotate gear 27 at twice the speed of worm wheel 66. But gear 27 can turn only at the speed dictated by gear 9 which is hooked up to shaft 7 through an already described ratchet system, thus synchronizing the rotation between ring 104 and support ring 115. In other words, while gear 27 turns ninety degrees in direction of arrow U, FIG. 5, worm gear 67 turns ninety degrees and ring 104 turns one hundred eighty degrees in direction of arrow R, and support ring 115 with flywheel 120 also turns one hundred eighty degrees in direction of arrow N.

Continuing rotation of support ring 115 will result in the reversal of rotation of ring 104 in the same manner as it has been described above. But this time, synchronization takes place through gear 10 (FIG. 4).

Since control 55 is in the center position, the pair of rotating forces which occur at the upper and lower halves of the mechanism, are perfectly balanced by each other providing that both flywheels are rotating at the same high speed. See arrows V, W, X and Y; also see FIG. 9k'.

When control 55 is moved to position Pi (FIG. 4), control assembly turns gears 53 and 54 in the direction of arrow Z in FIG. 1. Consequently, gears 43 and 42 turn in the opposite direction 45°, forcing pinions 38 and 39 and shaft 33 to turn 22.5° in the same direction while shaft 33 is rocking back and forth. The reason for this is the fact that the 45° back and forth motion of gear 27 cannot be shifted by any degree (see FIG. 5). Since the ratio of rotation between shaft 33 and rings 104 and 104A is 1:4, a 22.5° angle change of shaft 33 amounts to 90° shifting of the rings. (See FIG. 9k.)

Upon turning control 55 in position P2 (FIG. 4), the same action takes place as has just been described, but in the opposite direction. It should be mentioned that there is a gradual ratio of pulsing rotating force between the two maximum positions of control 55.

The construction and operation of the mechanism illustrated in FIGS. 6-8 is similar to that of FIGS. 1-5 and corresponding parts are identically numbered. The previously described control system 55 is eliminated. Instead, gear 42 is preset to achieve a desired direction of rotation. Judging from the positions of rings 104 and 104A and their respective flywheels, gear 42 is set at a neutral position. In other words, the apparatus will not rotate around its shafts 126 and 127 in either direction.

There are several reasons why both forms of apparatus described can take the place of an engine:

(1) The apparatus has no counter rotation. In a conventional helicopter where there is a tendency to counter rotation the helicopter has to use a counter-rotating tail rotor for proper balance. A helicopter employing the present invention as an engine needs no counter rotor.

(2) A great deal of energy which normally is lost in conventional engines, is put right back to the original source of power. Referring to the synchronization between the back and forth rotation of rings 104 and 104A, and the rotation of shafts 7 and 8, these rings would otherwise rotate at a great speed because of the gyroscopic action of their respective flywheels. Thus, when held back by shafts 7 and 8, the rings 104, 104A actually are helping the shafts to rotate.

One important characteristic of the apparatus described in FIGS. 6 to 8 is that the lower speed of its axial rotation, the higher its torque. Maximum torque is reached at zero axial rotation.

A question may arise as to whether cutting off the power supply of electric motor 1 will result in a continuous operation of the mechanism. This will not occur in the present apparatus because every time rings 104 and 104A change direction of rotation, the axis of their respective flywheels is in line with the axis of the rings. Thus, under these circumstances, the gyroscopic action of flywheels 120 and 120A cannot rotate their respective rings, which means that there is no transfer of power from gear 27 to either gear 9 or gear 10, so the whole operation will stop.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A gyroscopic apparatus for generating a rotating force about an axis without creating a counter rotating reaction, said apparatus comprising, in combination,
    (a) a framework having a longitudinal axis,
    (b) a pair of first rings mounted on the longitudinal axis of said framework, said first rings being diametrically rotatable about axes normal to said longitudinal axis of said framework,
    (c) a second ring mounted in each of said first rings, said second rings being diametrically rotatable about axes normal to the axes of said first rings,
    (d) a pair of counter rotating flywheels mounted within said second rings rotating about axes normal to the axes of said second rings,
    (e) a motor mounted on said framework, and
    (f) first transmission means driven by said motor rotating said second rings in said first rings, said first transmission mean having a pair of first gears rotatably mounted on each side of said first rings on the axes of said first rings, second gears rotatably mounted on said framework with each of said second gears meshing with one of said first gears, a first gear train driven by said motor driving said second gears, and second gear trains on said first rings each driven by rotation of said first gears, said second gear trains rotating said second rings within said first rings, precession of said flywheels on rotating said first rings causing relative rotation between said first and second gears influencing the precession of said flywheels.

2. The combination according to claim 1 wherein said first gear train has a pair of first shafts, two sets of driving and driven gears rotatably mounted on each of said first shafts, a differential shaft fixed normal to said first shafts between each set of said driving and driven gears, and at least one differential gear on each differential shaft engaging a drive and a driven gear; and with the addition of:
    (g) means limiting the rotation of said first shafts so that said first shafts restrict rotation of said first rings to 180 degrees, and
    (h) two ratchet systems driving in different directions, and
    (i) a third gear train connecting said first shafts to said motor through said ratchet systems, precession of said flywheels rotating said first rings and assisting said motor through one of said ratchet systems.

3. The combination according to claim 2 with the addition of
 (j) control means setting the limits of the range of rotation of said first shafts.

References Cited

UNITED STATES PATENTS

| | | | |
|---|---|---|---|
| 1,016,240 | 1/1912 | Alexieff | 74—5.34 |
| 1,050,153 | 1/1913 | Marmonier | 74—5.34 |
| 1,232,619 | 7/1917 | Sperry | 74—5.34 |
| 1,324,477 | 12/1919 | Tanner | 74—5.34 |
| 1,452,482 | 4/1923 | Sperry | 74—5.34 |
| 3,323,380 | 6/1967 | Tenbosch et al. | 74—5.34 |

FOREIGN PATENTS 378,545   8/1932   Great Britain.

C. J. HUSAR, *Primary Examiner.*